United States Patent
Yamaoka

(10) Patent No.: US 6,192,288 B1
(45) Date of Patent: Feb. 20, 2001

(54) LASER BEAM MACHINING EQUIPMENT

(75) Inventor: Yoshihisa Yamaoka, Seki (JP)

(73) Assignee: Yamazaki Mazak Kabushiki Kaisha (JP)

(*) Notice: Under 35 U.S.C. 154(b), the term of this patent shall be extended for 0 days.

(21) Appl. No.: 09/150,183

(22) Filed: Sep. 10, 1998

(51) Int. Cl.[7] .................................................. G06F 19/00
(52) U.S. Cl. .......................................... 700/116; 700/226
(58) Field of Search ................................... 700/112, 116, 700/124, 166, 115, 214, 215, 225, 226, 169

(56) References Cited

U.S. PATENT DOCUMENTS

| | | | |
|---|---|---|---|
| 4,998,206 | 3/1991 | Jones et al. | 700/96 |
| 5,407,081 | * 4/1995 | Oshino et al. | 209/538 |
| 5,450,333 | 9/1995 | Minami et al. | 700/167 |
| 5,500,507 | * 3/1996 | Yoshiaki | 219/121.82 |
| 5,815,398 | * 9/1998 | Dighe et al. | 700/217 |
| 6,074,329 | * 6/2000 | Hirano et al. | 483/16 |

FOREIGN PATENT DOCUMENTS

| | | |
|---|---|---|
| 58-199659 | * 11/1983 | (JP) . |
| 03205223 | * 9/1991 | (JP) . |
| 07124773 | * 5/1995 | (JP) . |

OTHER PUBLICATIONS

Eom et al., Recognition of Shapes by Statistical Modeling of Centroidal Profile, IEEE, 860–864, 1990.*
Bradley et al., Industrial Inspection Employing a Three Dimensional Vision System and a Neural Network Classifier, IEEE, 505–508, 1995.*

* cited by examiner

Primary Examiner—William Grant
Assistant Examiner—Chad Rapp
(74) Attorney, Agent, or Firm—Richard P. Gilly

(57) ABSTRACT

The program memory 23 for storing the machining program MPR1 which instructs to carry the raw material workpiece 29 with the workpiece carrying robot 7 and to machine with the laser beam machine 3, and the classification program TPR1 which instructs to classify and carry the machined raw material workpiece to each classification rack 10, corresponding to each raw material workpiece, is provided. On the basis of the machining instruction from the input portion 17, the machining program MPR1 and the classification program TPR1 corresponding to the raw material workpiece, on which machining is instructed, are read out of the program memory 23. The machining portions 2, 3, 5 are instructed to machine on the basis of the read machining program, and the classification portions 9, 13, 15 are instructed to classify on the basis of the read classification program TPR1.

8 Claims, 3 Drawing Sheets

LASER BEAM MACHINING EQUIPMENT

BACKGROUND OF THE INVENTION

This invention relates to a laser beam machining equipment automatically performing classification work of machined raw material workpieces without teaching.

Conventionally, in this kind of laser beam machining equipment, the classification work of cutting parts after machining has been almost manually performed, then it has not been automatized.

In order to automatize such work, such method that classification robot is programmed to classify each cutting parts by teaching by an worker, thereby the classification robot is operated to carry the cutting parts to a predetermined classfication position may be adopted.

However, this method is effective when many numbers of workpieces are machined, but it takes many time for teaching work when a few numbers of workpieces are machined, so it is not practical.

Taking the above into consideration, the object of this invention is to automatize classification work of cutting parts of machined raw material workpieces, and especially, to provide a laser beam machining equipment having a classifiction means capable of automatically performing classification work after machining without teaching which takes long time.

SUMMARY OF THE INVENTION of the present invention, the 1st claim comprises a laser beam machining equipment comprising:

a machining portion and a classification portion;

said machining portion having a raw material stocker, a laser beam machine, a classification head and a workpiece carrying means, said workpiece carring means carrying a raw material workpiece by communicating among said raw material stocker, said laser beam machine and said classification head;

said classification portion having a plurality of classification storing means for storing cutting parts cut classificating every respective cutting parts, and a workpiece classification carrying means capable of respectively classifying and carrying said respective cutting parts of machined raw material workpiece on said classification head carried by said workpiece carrying means in said classification storing means; said laser beam machining equipment further comprising:

a program memory for storing a machining program which instructs to carry a raw material workpiece with said workpiece carrying means among said raw material stocker, said laser beam machine and said classification head and to machine with said laser beam, and a classification program which instructs to carry and classify machined raw material workpiece carried on said classification head to each classification storing means between said classification head and said classification storing means with said workpiece classification carrying means, corresponding to each raw material workpiece;

a machining instruction means instructing said laser beam machining equipment to machine on a predetermined raw material workpiece;

a machining control means for reading machining program corresponding to said raw material workpiece on which machining is instructed, out of said program memory on the basis of machining instruction from said machining instruction means, and for instructing and controlling machining work on the basis of said read machining program; and a classification control means for reading said classification program corresponding to said raw material workpiece on which machining is instructed, out of said program memory, and for instructing and controlling classification work on the basis of said read classification program.

With this invention, the classification work for classifying cutting parts from machined raw material workpieces can be automatically performed with only instructing to machine raw material workpiece to be machined through machining instruction means without teaching which takes long time, then, a routine work from carrying raw material to classifying products can be smoothly performed without hands. Especially, when the number of raw material workpieces to be machined are not many, set up time is widely shortened.

Besides, the 2nd claim comprises the laser beam machining equipment as set forth in claim 1, wherein a classification storing means position information memory for storing position information of each classification storing means in the classification portion, and a classification information memory for storing classification information showing in which classification storing means the cutting parts cut out of a raw material workpiece should be classified are provided, and a classification program producing portion for producing said classification program on the basis of said position information of said classification storing means, said classification information and position information showing the position of each cutting parts on said raw material workpiece is provided.

With this invention, the classification program producing portion can automatically produce the classification program on the basis of various kinds of informations above-mentioned.

Besides, the 3rd claim comprises the laser beam machining equipment as set forth in claim 2, wherein the position information showing a position of said respective cutting parts is a cutting machining program having movement instructions for machining respective cutting parts out of said raw material workpiece in said machining program.

With this invention, the classification program can be immediately produced taking use of the informations such as movement instructions in the machining program, and the input of new informations for producing classification program can be extremely reduced, then it is very convenient.

Besides, the 4th claim comprises the laser beam machining equipment as set forth in claim 2, wherein said classification head has a first standard position, said classification storing means position information memory stores coordinate position information with respect to said first standard position of said classification storing means.

With this invention, the position relation between each storing means and classification head is made clear, and the production of classification program can be easily performed.

Besides, the 5th claim comprises the laser beam machining equipment as set forth in claim 2, wherein said classification head has a first standard position, and said classification program producing portion produces said classification program on the basis of a position relation between a standard position which is the basis of a position of respective cutting parts of said raw material workpiece and said first standard position.

With this invention, the position relation between the position of each cutting parts of raw material workpiece and classification head is made clear, then the production of classification program can be easily performed.

Besides, the 6th claim comprises the laser beam machining equipment as set forth in claim 2, wherein a classification program producing instruction means operable by an operator, for instructing said classification program producing portion to produce classification program is provided.

With this invention, the classification program can be produced with only operating the classification program producing instruction means by an operator.

Besides, the 7th claim comprises the laser beam machining equipment as set forth in claim 1, wherein said classification head has a first standard position, and a workpiece carrying control means for carrying and positioning machined raw material workpiece to a predetermined position with respect to said first standard position of said classification head with said workpiece carrying means is provided.

With this invention, a workpiece can be carried and positioned on a predetermined position on the classification head, and the position of each cutting parts of machined raw material workpiece on the classification head can be easily known.

Besides, the 8th claim comprises the laser beam machining equipment as set forth in claim 1, wherein said machining program and said classification program are stored being independent from the other.

With this invention, the production and correction of the classification program can be performed independent of the machining program, and the change of position of the classification storing means can be easily performed regardless of the machining program.

DESCRIPTION OF THE PREFERRED EMBODIMENT

Embodiments of the present invention will now be described hereinafter with respect to the accompanying drawings.

Figure 1:
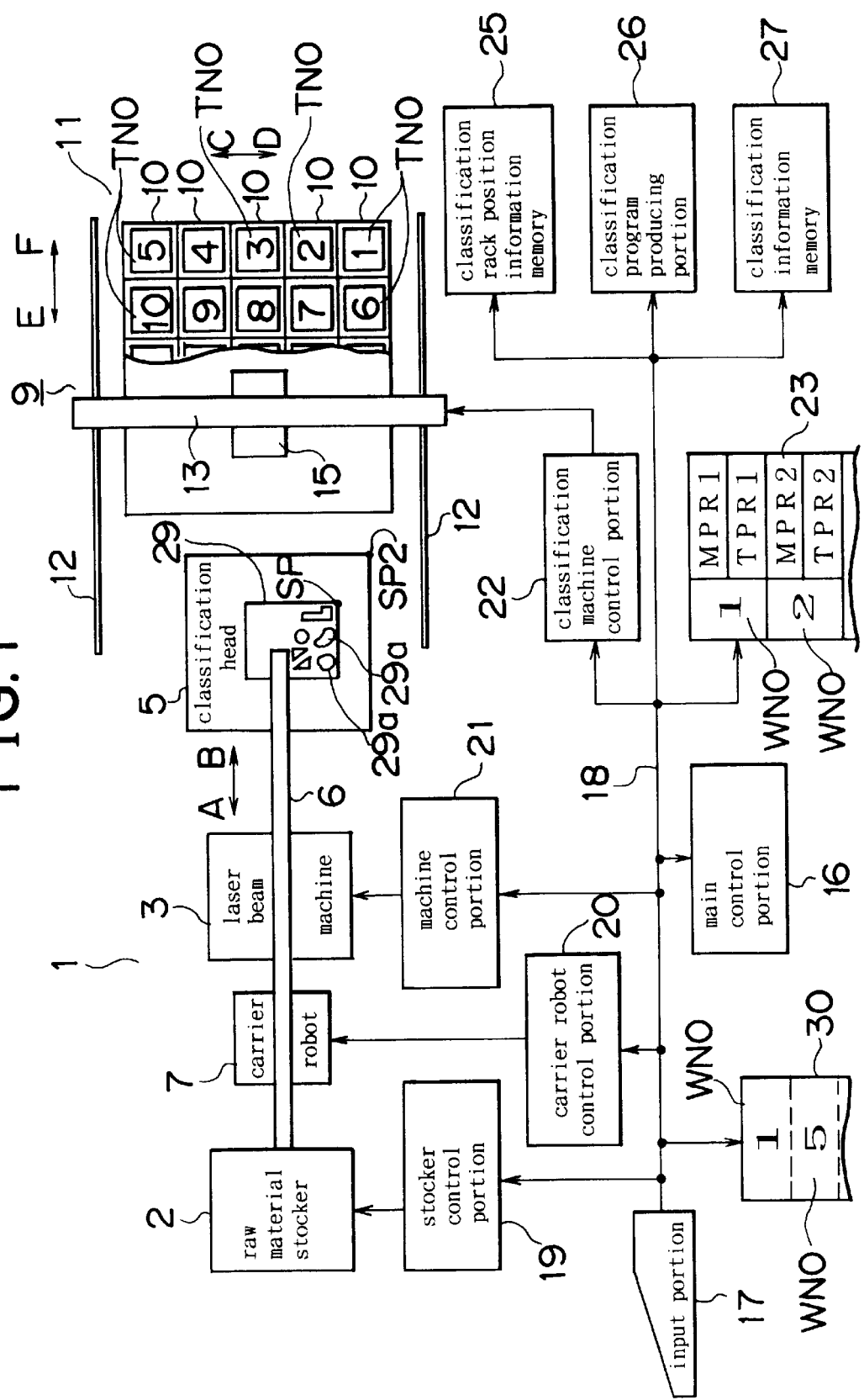
FIG. 1 is a block diagram showing an example of a laser beam machining equipment according to the present invention.

A laser beam machining equipment 1 according to this present invention has a raw material stocker 2 for loading and stocking raw material workpieces in the shape of a plate, as shown in FIG. 1. On the right hand of the raw material stocker 2 in the figure, a laser beam machine 3 is provided. on the right hand of the laser beam machine 3 in the figure, a classification head 5 is provided. On the upper hand of the raw material stocker 2, the laser beam machine 3 and the classification head 5 (shown with a top view in the figure), a guide rail 6 is provided communicating and connecting thereamong. A carrier robot 7 is provided with the guide rail 6, movable and drivable in the directions as shown by the arrows A and B along the guide rail 6. On the right hand of the classification head 5 in the figure, a machined workpiece stocker 9 is provided. The machined workpiece stocker 9 has a classification field 11, at which many classification racks 10 each shaped in a cube are longitudinally and laterally installed on a plane (that is, in the directions as shown by the arrows C and D and in the directions as shown by the arrows E and F). On the upper and the lower of the classification field 11 in the figure, rails 12, 12 are parallel installed in the directions as shown by the arrows E and F, sandwitching the classification field 11. A gantry 13 is provided with the rails 12 and 12, being able to run in the directions as shown by the arrows E and F. A workpiece carrier robot 15 is provided with the gantry 13, movable and drivable in the directions as shown by the arrows C and D. To each classification rack 10 located on the classification field 11, a classification rack position number TNO for differentiating each classification rack 10 from the other is affixed.

On the other hand, the laser beam machining equipment 1 has a main control portion 16. With the main control portion 16, an input portion 17, a stocker control portion 19, a machining order memory 30, a carrier robot control portion 20, a machine control portion 21, a classification machine control portion 22, a program memory 23, a classification rack information memory 25, a classification program producing portion 26 and the classification information memory 27 are connected via a bus line 18.

The laser beam machining equipment 1 has the structure described above. Then, a raw material workpiece 29 is machined with the laser beam machining equipment 1 in the machining order of the raw material workpiece 29 stored in the machining order memory 30 in advance through the input portion 17. That is, as shown in FIG. 1, the orders of the machining to be performed from now on with the laser beam machining equipment 1 are stored in order from the upper in the figure in the machining order memory 30, instructing a raw material workpiece nubmer WNO. In case of FIG. 1, instruction is that in first, the raw material workpiece 29 which the raw material workpiece number WNO is 1 is machined, thereafter the workpiece which raw material workpiece number WNO is 5 is machined.

In this way, the main control portion 16 reads out 1 of the raw material workpiece number WNO on the basis of the machining order of the workpiece stored in the machining order memory 30, and acknowledges that the raw material workpiece 29 to be firstly performed with the laser beam machining equipment 1 is the raw material workpiece which the raw material workpiece number WNO is 1.

Subsequently, the main control portion 16 searches for the program memory 23 and reads out a machining program MPR1 and a classification program TPR1 which correspond to 1 of the raw material workpiece number WNO. The machining program MPR and the classification program TPR are stored in the program memory 23, corresponding for each corresponding raw material workpiece WNO, then, when the raw material workpiece number WNO of the raw material workpiece to be machined is known, the corresponding machining program MPR1 and the classification program TPR1 can be immediately read out. On this occasion, the machining program MPR is one for carrying the raw material workpiece 29 out of the raw material stocker 2 by the carrier robot 7 so as to provide with the laser beam machine 3, performing a predetermined cutting machining with the laser beam machine 3 and carrying the machined raw material workpiece 29 after the cutting machining to the classification head 5 with the carrier robot 7. Besides, the classification program TPR is one for classifying a plurality of cutting parts 29a out of the machined raw material workpieces 29 carried on the classification head 5 with the carrier robot 7, into each classification rack 10 of the classification field 11 from the classification head 5 with the workpiece carrier robot 15.

Figure 2:
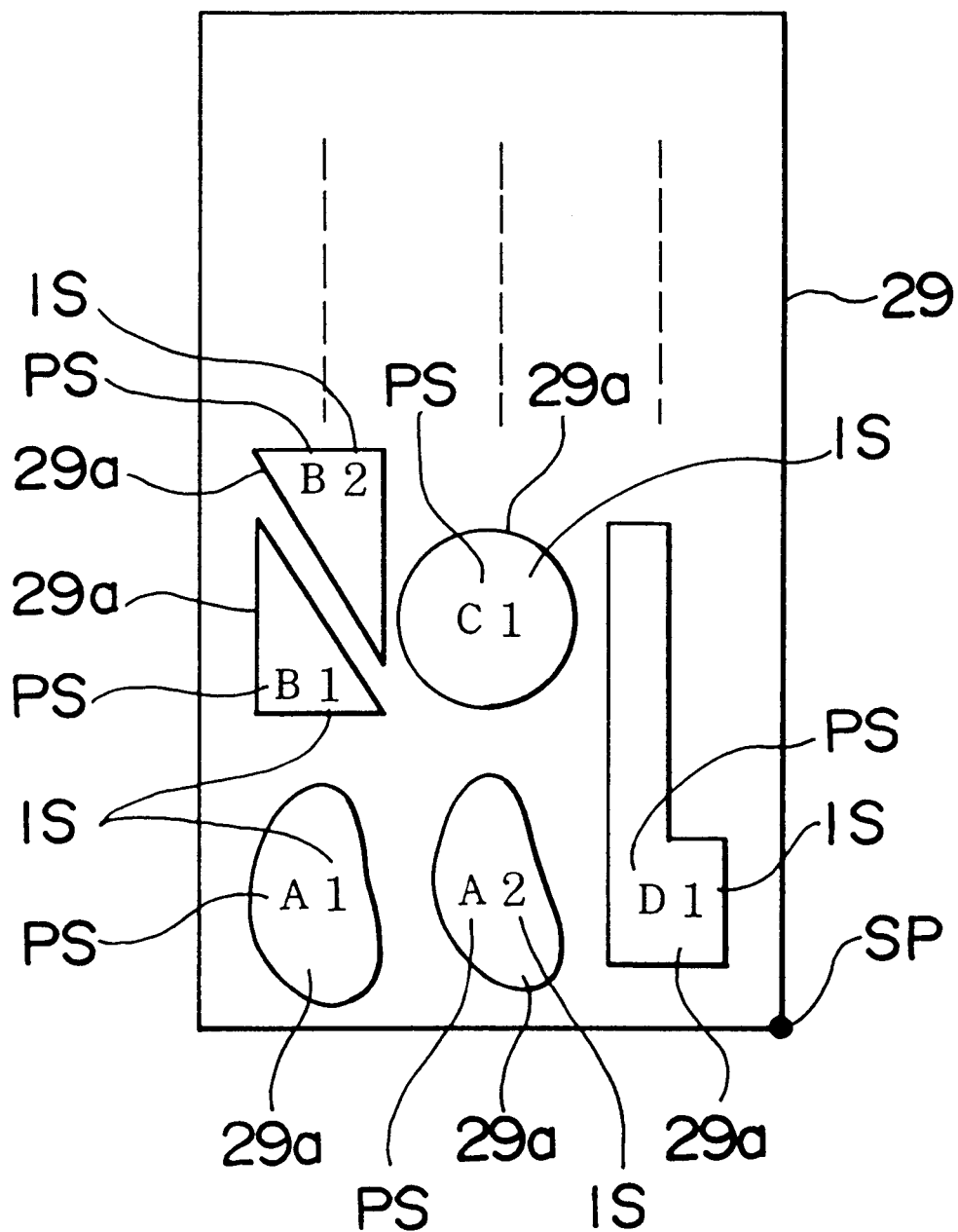
FIG. 2 is a view showing nesting on a raw material workpiece.

The machining program MPR and the classification program TPR corresponding to each raw material workpiece 29 can be also produced by inputting from the input portion 17 by an operator prior to machining. On the other hand, the program produced in advance for each raw material workpiece with a program producing unit provided independent of the laser beam machining equipment 1 or the like may be input and stored in the program memory 23. The machining program MPR includes the cutting machining program CPR for performing laser beam cutting machining on the raw material workpiece 29 on which a plurality of cutting parts 29a to be machined are located so as to nest, as shown in FIG. 2. The cutting machining program CPR has movement instruction for performing cutting machining on each cutting parts 29a on the basis of a predetermined standard point SP on the raw material workpiece 29. Then, the raw material workpiece 29 cut and machined with the laser beam machine 3 on the basis of the cutting machining program CPR of the machining program MPR is carried and located on a predetermined position of the classification head 5 with the carrier robot 7 as it is so as to easily compute the position of each cutting parts 29a on the classification head 5 based on the standard point SP in the cutting machining program CPR.

Therefore, when the machining program MPR an d the classification program TPR of some raw material workpiece 29 are produced by operating a keyboard of the input portion 17 of the laser beam machining equipment 1 or the like by an operator at a machining time or prior to machining (similar to the case where they are produced with a program producing unit provided independent of the laser beam machining equipment 1 or the like), at first, the machining program MPR including the cutting machining program CPR on the raw material workpiece 29 to be machined is produced using a well-known atomatic program method. After producing the machining program MPR, then the classification program TPR for the raw material workpiece 29 is produced. In this case, an operator instructs the main control portion 16 through the input portion 17 as to in which classification rack 10 of the classification field 11 respective cutting parts 29a cut and machined out of the raw material workpiece 29 are classified and stored.

Assuming that respective cutting parts 29a are nested on the raw material workpiece 29, as shown in FIG. 2, such as A1, A2, B1, B2, C1 and D1 (The alphabetical portion of a capital letter shows parts symbol PS showing the cutting parts of the same form kind, and remaining number is individual symbol is for differentiating from another if a plurality of cutting parts of the same form are in the same raw material workpiece. In case where individual cutting parts is not differentiated, the individual symbol is after the parts symbol is shown as [X].) by the method well-known in the machining program MPR, and the cutting machining program CPR comprised of movement instructions for performing cutting machining on respective cutting parts 29a on the basis of a predetermined standard point SP on the raw material workpiece 29 is also produced, an operator inputs classification information TI showing as to in which classification rack 10 of the classification field 11 the respective cutting parts 29a of the raw material workpiece 29 are classified and stored, in the main control portion 16 through the input portion 17. The classification information TI is stored in the classification information memory 27, as shown in FIG. 3.

Figure 3:
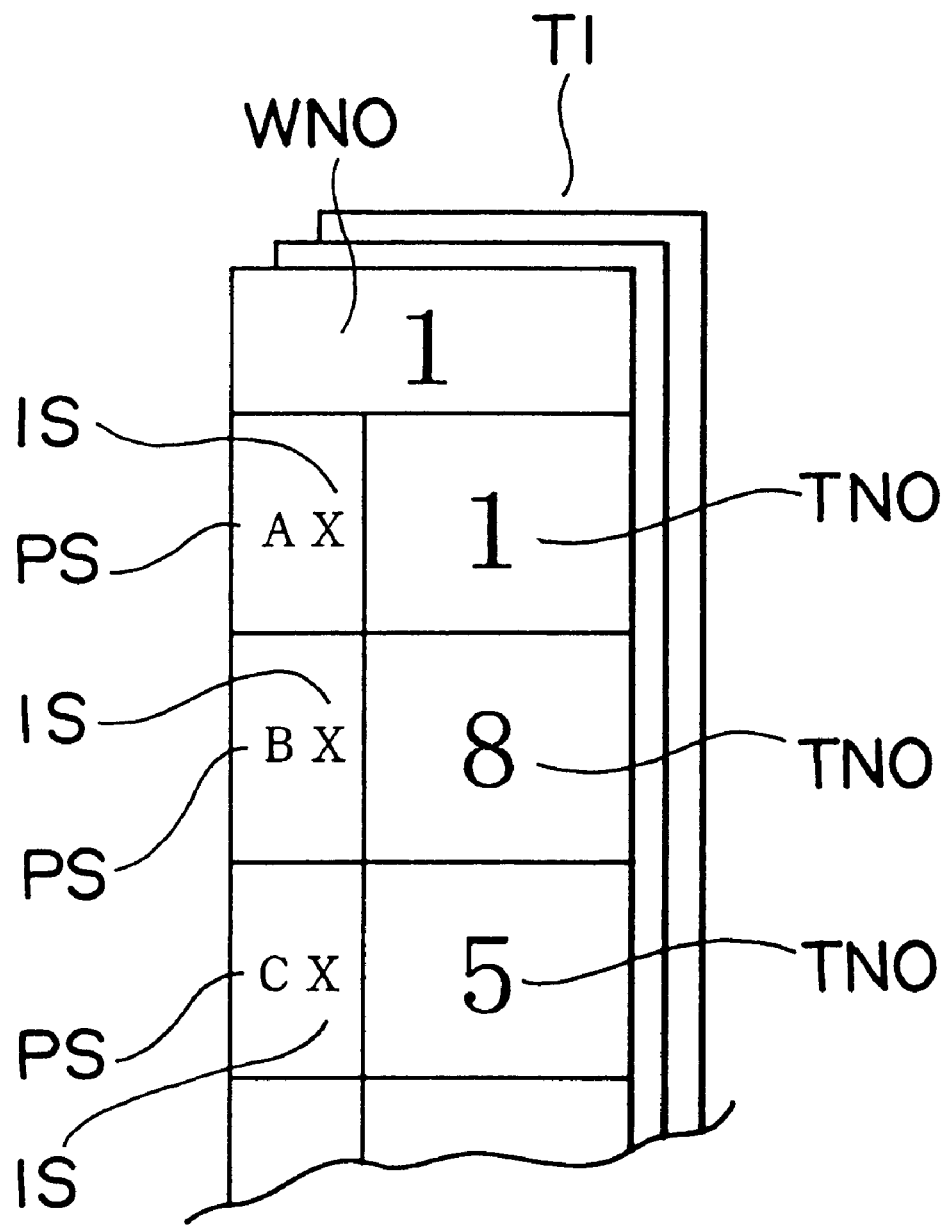
FIG. 3 is a typical view showing classification informations in a classification information memory.

That is, the classification information TI in the classification information momory 27 shows as to in which classification rack 10 the cutting parts 29a cut out of a raw material workpiece is classified and stored, classifying every parts symbol PS of each cutting parts with the classification rack position number TNO for differentiating each classification rack 10 located on the classification field 11, corresponding to the raw material workpiece number WNO of each raw material workpiece 29, as shown in FIG. 3. Then, an operator instructs the main control portion 16 to produce the classification program TPR through the input portion 17 after inputting the classification information TI for each raw material workpiece 29. Receiving this, the main control portion 16 instructs the classification program producing portion 26 to produce the classification program TPR.

Receiving this, the classification program producing portion 26 produces the classification program TPR for classifying and storing respective cutting parts 29a of the raw material workpiece 29 in each classification rack 10 of the classification field 11 from the classification head 5 by the workpiece carrier robot 15 on the basis of the classification information TI stored in the classification information memory 27, the cutting machining program CPR in the machining program MPR stored in the program memory 23 and coordinated position information CI of each classification rack 10 with respect to a standard position SP2 of the classification head 5, which is stored in the classification rack position information memory 25, so as to store in an address corresponding to the corresponding raw material workpiece number WNO in the program memory 23.

As shown in FIG. 2, since the cutting machining program CPR is formed on the basis of the standard position SP of the raw material workpiece 29, the position of each cutting parts 29a on the raw material workpiece 29 can be easily known by referring to the cutting machining program CPR. Besides, as already described, since the coordinate position information CI of each classification rack 10 with respect to the standard position SP2 of the classification head is stored in the classification rack position information memory 25, the classification program TPR can be easily produced on the basis of the classification information TI stored in the classification information memroy 27 if the position relation between the standard position SP of the raw material workpiece 29 and the standard position SP2 of the classification head 5 is clear (that is, as long as the machined raw material workpiece 29 is precisely carried and positioned by the carrier robot 7 to a predetermined position on the classification head 5).

As already described, in this way, the main control portion 16 reads out 1 of the raw material workpiece number WNO on the basis of the machining order of a workpiece stored in the machining order memory 30 so as to confirm that the raw material workpiece 29 to be firstly machined with the laser beam machining equipment 1 is the raw material workpiece of which the raw material workpiece number WNO is 1, thereafter, searched for the program memory 23 so as to read out the machining program MPR1 and the classification program TPR1 which correspond to 1 of the raw material workpiece number WNO. Subsequently, the main control portion 16 instructs the stocker control portion 19 to carry the raw material workpiece 29 to be machined from now on which the raw material workpiece number WNO is 1 to the carrier robot 7 on the basis of the machining program MPR1, and instructs the carrier robot 7 to take the corresponding raw material workpiece 29 out of the raw material stocker 2 and to carry it to the laser beam machine 3 through the carrier robot control portion 20.

Besides, the main control portion 16 instructs the machine control portion 21 to machine the workpiece of which the raw material workpiece number WNO is 1 with the laser beam machine 3, and then, the laser beam machine 3 machines the raw material workpiece 29 on the basis of the cutting machining program CPR of the machining program MPR1. After finishing the cutting machining with the laser beam machine 3, the main control portion instructs again the carrier robot control portion 20 to carry the raw material workpiece 29 after the cutting machining to the classification head 5.

When the machined raw material workpiece 29 is carried and located on a predetermined position on the classification head 5 with the carrier robot 7 in this way, the main control portion reads out the classification program TPR1 stored at the address which corresponds to 1 of the raw material workpiece number WNO carried to the classification head 5, in the program memroy 23, and instructs the classification machine control portion 22 to classify and store the cutting parts 29a of the machined raw material workpiece 29 located on the classification head 5 in a predetermined classification rack 10 located in the classification field 11 on the basis of the classification program TPR1 with the workpiece carrier robot 15. Receiving this, classification work is done by the classification control portion 22, classifying the cutting parts 29a of the machined raw material workpiece 29 on the classification head 5 in each classification rack 10 located on the classification field 11 instructed by the classification program TPR1 on the basis of the classification program TPR1 by moving the gantry 13 in the directions as shown by the arrows E and F and moving the workpiece carrier robot 15 in the directions as shown by the arrows C and D on the gantry 13, then the machining and classification work on the raw material workpieces 29 finishes. As already described, since as to in which classification rack 10 respective cutting parts 29a which are nested as shown in FIG. 2, of the raw material workpiece 29 of which the raw material workpiece number WNO is 1, are carried and classified is stored in the classification program TPR1 as movement instructions, classification work is smoothly performed as long as the standard position SP of the machined workpiece 29 is positioned at a fixed position with respect to the standard position SP2 of the classification head 5 by the carrier robot 7.

The present invention has been explained on the basis of the embodiments presented herein. However, the embodiments which are described in the present specification are illustrative and not limiting. The scope of the invention is designated by the accompanying claims and is not restricted by the descriptions of the specific embodiments. Accordingly, all the transformations and changes belonging to the claims are included in the scope of the present invention.

What is claimed is:

1. A laser beam machining equipment comprising:
   a machining portion and a classification portion;
   said machining portion having a raw material stocker, a laser beam machine, a classification head and a workpiece carrying means, said workpiece carring means carrying a raw material workpiece by communicating among said raw material stocker, said laser beam machine and said classification head;
   said classification portion having a plurality of classification storing means for storing cutting parts cut classificating every respective cutting parts, and a workpiece classification carrying means capable of respectively classifying and carrying said respective cutting parts of machined raw material workpiece on said classification head carried by said workpiece carrying means in said classification storing means; said laser beam machining equipment further comprising:
   a program memory for storing a machining program which instructs to carry a raw material workpiece with said workpiece carrying means among said raw material stocker, said laser beam machine and said classification head and to machine with said laser beam, and a classification program which instructs to carry and classify machined raw material workpiece carried on said classification head to each classification storing means between said classification head and said classification storing means with said workpiece classification carrying means, corresponding to each raw material workpiece;
   a machining instruction means instructing said laser beam machining equipment to machine on a predetermined raw material workpiece;
   a machining control means for reading machining program corresponding to said raw material workpiece on which machining is instructed, out of said program memory on the basis of machining instruction from said machining instruction means, and for instructing and controlling machining work on the basis of said read machining program; and
   a classification control means for reading said classification program corresponding to said raw material workpiece on which machining is instructed, out of said program memory, and for instructing and controlling classification work on the basis of said read classification program.

2. The laser beam machining equipment as set forth in claim 1, wherein a classification storing means position information memory for storing position information of each classification storing means in the classification portion, and a classification information memory for storing classification information showing in which classification storing means the cutting parts cut out of a raw material workpiece should be classified are provided, and a classification program producing portion for producing said classification program on the basis of said position information of said classification storing means, said classification information and position information showing the position of each cutting parts on said raw material workpiece is provided.

3. The laser beam machining equipment as set forth in claim 2, wherein the position information showing a position of said respective cutting parts is a cutting machining program having movement instructions for machining respective cutting parts out of said raw material workpiece in said machining program.

4. The laser beam machining equipment as set forth in claim 2, wherein said classification head has a first standard position, said classification storing means position information memory stores coordinate position information with respect to said first standard position of said classification storing means.

5. The laser beam machining equipment as set forth in claim 2, wherein said classification head has a first standard position, and said classification program producing portion produces said classification program on the basis of a position relation between a standard position which is the basis of a position of respective cutting parts of said raw material workpiece and said first standard position.

6. The laser beam machining equipment as set forth in claim 2, wherein a classification program producing instruction means operable by an operator, for instructing said classification program producing portion to produce classification program is provided.

7. The laser beam machining equipment as set forth in claim 1, wherein said classification head has a first standard position, and a workpiece carrying control means for carrying and positioning machined raw material workpiece to a predetermined position with respect to said first standard position of said classification head with said workpiece carrying means is provided.

8. The laser beam machining equipment as set forth in claim 1, wherein said machining program and said classification program are stored being independent from the other.

* * * * *